Figure 1:
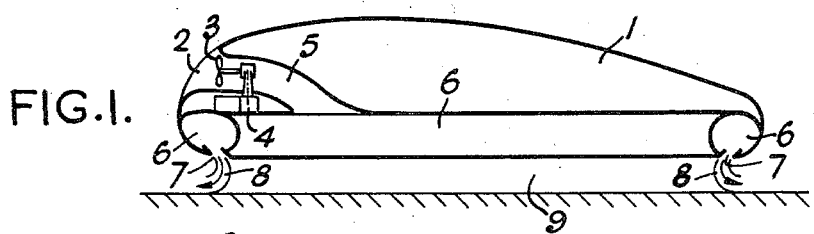

March 23, 1965 W. J. EGGINGTON 3,174,569
VEHICLES FOR TRAVELLING OVER LAND AND/OR WATER
Filed Oct. 7, 1960 3 Sheets-Sheet 1

Inventor
WILFRED J. EGGINGTON
By Cameron, Kerkam & Sutton
Attorneys

March 23, 1965 W. J. EGGINGTON 3,174,569
VEHICLES FOR TRAVELLING OVER LAND AND/OR WATER
Filed Oct. 7, 1960 3 Sheets-Sheet 2

Inventor
WILFRED J. EGGINGTON
By Cameron, Kerkam & Sutton
Attorneys

March 23, 1965 W. J. EGGINGTON 3,174,569
VEHICLES FOR TRAVELLING OVER LAND AND/OR WATER
Filed Oct. 7, 1960 3 Sheets-Sheet 3
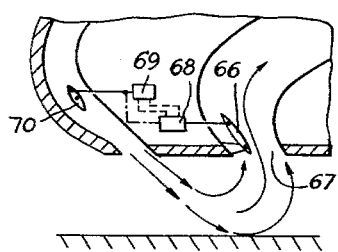
FIG. 10.
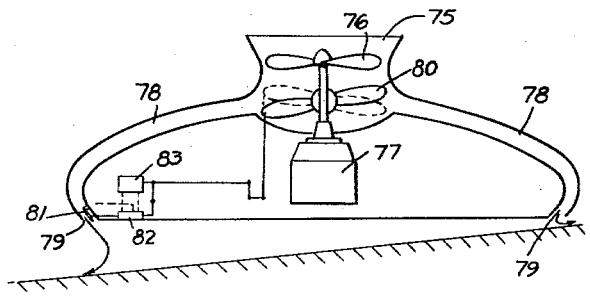
FIG. 11.
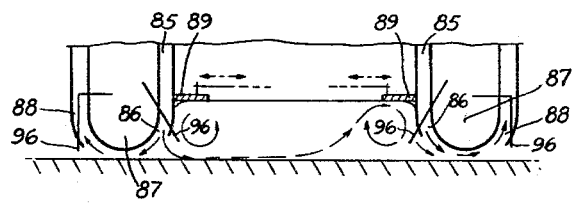
FIG. 12.
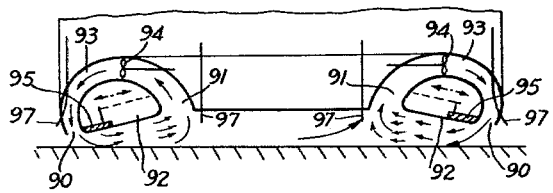
FIG. 13.
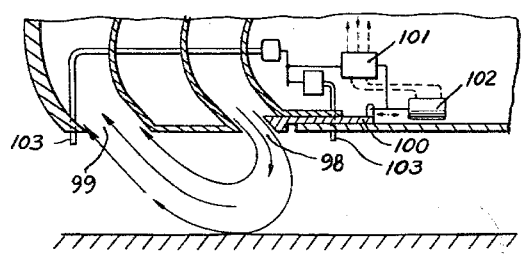
FIG. 14.
FIG. 15.
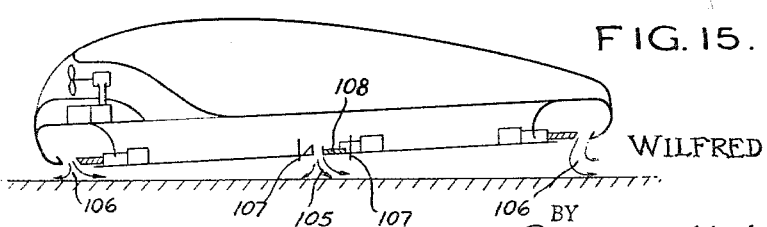
INVENTOR
WILFRED J. EGGINGTON
BY Cameron, Kerkam & Sutton
ATTORNEYS United States Patent Office 3,174,569
Patented Mar. 23, 1965

3,174,569
VEHICLES FOR TRAVELLING OVER LAND
AND/OR WATER
Wilfred James Eggington, East Cowes, Isle of Wight, England, assignor to Hovercraft Development Limited, London, England, a British company
Filed Oct. 7, 1960, Ser. No. 61,150
Claims priority, application Great Britain, Oct. 9, 1959, 34,385/59
18 Claims. (Cl. 180—7)

This invention relates to vehicles for travelling over land and/or water and which are partly or wholly supported above the surface of the land and/or water by one or more cushions of pressurised gas.

In such vehicles one or more jets of fluid are caused to flow between the bottom of the vehicle and the surface over which the vehicle is operating such that the flow of fluid together with the structure of the vehicle and the surface encloses at least one space beneath the vehicle which is filled by a cushion of pressurised gas which at least partly supports the vehicle over the surface.

The above described method of support is also applicable to a platform primarily intended to remain stationary, for example for supporting a radar installation, and the term vehicle as used hereinafter is to be understood as including, where the context permits, a platform.

The jet of fluid which flows between the bottom of the vehicle and the surface may be of varying flow patterns. For example, in what is hereinafter referred to as a simple curtain system, the jet may issue from a supply port in the bottom of the vehicle, the fluid of the jet flowing first downwards and inwards towards the surface in the form of a fluid curtain. A cushion of pressurised fluid is built up beneath the vehicle, contained round its periphery by the fluid curtain. The pressure of the cushion deflects the fluid curtain outwards, the fluid forming the curtain flowing outwards in contact with the surface. Such a flow pattern is described in the co-pending application of Christopher Sydney Cockerell, Serial No. 627,925, filed December 12, 1956. In an alternative flow pattern, hereinafter referred to as a recovery system, at least part of the fluid forming the curtain may be recovered through a recovery port formed in the bottom of the vehicle adjacent to the supply port. A flow pattern of this type is described in the co-pending application of Christopher Sydney Cockerell, Serial No. 837,428, filed September 1, 1959, now abandoned. Other alternative flow patterns are the systems described in the co-pending Cockerell application Serial No. 62,649, filed October 14, 1960, corresponding to U.K. patent application No. 35,163/59, based on the so-called Coanda system, and the diffusion system. In the Coanda system the fluid enclosing the space beneath the vehicle is caused to flow under and continuously in contact with the bottom of a downward projecting rim by profiling the bottom of the rim so that the fluid flow remains attached to the rim by Coanda or similar effect. In the diffusion system, fluid issues from an annular supply port formed in the bottom of the vehicle, the bottom surface of the vehicle being shaped so that it forms, with the surface over which the vehicle is operating, a divergent passage which increases in height towards the space beneath the vehicle in which is formed the cushion. The fluid issuing from the supply port flows inwards through the divergent passage towards the cushion, the fluid being diffused so that the velocity of flow from the supply port is transformed to a static pressure at the periphery of the cushion. For convenience the fluid flowing between the bottom of the vehicle and the surface over which the vehicle is operating will be referred to as the fluid curtain, whatever flow pattern the fluid assumes.

Under steady conditions, the pressure differential across the fluid curtain will be uniform all round the vehicle, the mass flow of the curtain forming fluid being such that it contains the desired cushion pressure at the predetermined operating height. Varying local conditions round the periphery of the vehicle which occur in operation may cause local variations of the pressure differential across the fluid curtain, and/or of the height of the vehicle bottom relative to the surface. If the mass flow of the fluid curtain remains unchanged, either of these local variations will upset the equilibrium of the fluid curtain. Thus at a point of reduced pressure differential, the mass flow of the fluid curtain is too great for this pressure differential and part of the fluid forming the curtain flows inwards into the cushion, whilst at a point of increased pressure differential, the mass flow of the fluid curtain is insufficient to contain this pressure differential and part of the cushion fluid escapes outwards. Again, at a point where the height of the vehicle bottom relative to the surface decreases, while the pressure differential remains unaltered, the mass flow of the fluid curtain is excessive and part of the fluid will flow inwards into the cushion. The converse obtains at a point of increased relative height.

If, as is often the case, a region of decreased pressure differential or relative height is matched by a region of increased pressure differential or relative height at some other position of the vehicle periphery, the fluid flowing inwards from the fluid curtains at the former region will in the main find its way to the latter region and escape to the surrounding atmosphere. The phenomenon in this case manifests itself as one of cross-flow of fluid from the former region to the latter region, and is hereinafter referred to a "cross-flow." Even in the case just described it is an over-simplication to say that all the fluid flowing inwards at the first region escapes outwards from the second region. In fact, in the general case, there will be a continuous gradation of inward and outward flow round the periphery of the curtain but the term "cross-flow" is used to include all such inward and outward flow.

The present invention is based on my observation of the phenomena described above, as the fluid which is cross-flowing loses energy to the cushion fluid without any benefical effect, which is a waste of power, and its object is to reduce or eliminate such phenomona. I have found that cross-flow, whether it is caused by variations of pressure differential or of height or from any other cause, can be regarded as a consequence of a mis-match between the actual mass flow of the fluid forming the fluid curtain at a particular locality and the mass flow which is required to sustain the cushion in the conditions prevailing at the locality.

According to the invention, in a vehicle for travelling over land and/or water which is supported above the surface over which it is operating by at least one cushion of pressurised fluid, the cushion being contained for at least part of its periphery by a fluid curtain formed by fluid flowing between the bottom surface of the vehicle and the surface over which the vehicle is operating, means are provided for adjusting the mass flow of the fluid forming the fluid curtain at any locality round the circumference of the fluid curtain at which the actual mass flow varies from that required to sustain the cushion in the conditions prevailing at that locality.

The variation of the mass flow from that required may be determined by the variation of certain parameters such as the height of the vehicle bottom above the surface, the static pressure just outside the fluid curtain and the cushion pressure just inside the fluid curtain (that is, the differential pressure across the air curtain), and where the flow pattern of the curtain forming fluid is of the relevant form, the angle of the curtain forming jet of fluid to the horizontal or the angle of flow of fluid into the recovery port in a recovery system. Depending upon the particular parameter or parameters used, indications of the variation of one or more of such parameters may be required, and according to a further feature of the invention, means are provided for sensing one or more parameters, variation of which result in or result from mis-matching of the actual mass flow and desired mass flow of the fluid forming the curtain, the said means providing a signal indicative of such variations, the signal being used to adjust the mass flow at the relevant localities to reduce or remove the mis-matching of the mass flow.

The fluid forming the curtain is normally a gas such as air or exhaust gas or a mixture of both, although other fluids such as water can be used. Similarly the gas forming the cushion is normally air although exhaust gases or a mixture of both can be used. For convenience, hereinafter both the curtain forming fluid and cushion forming gas will be considered as air.

Figure 2:
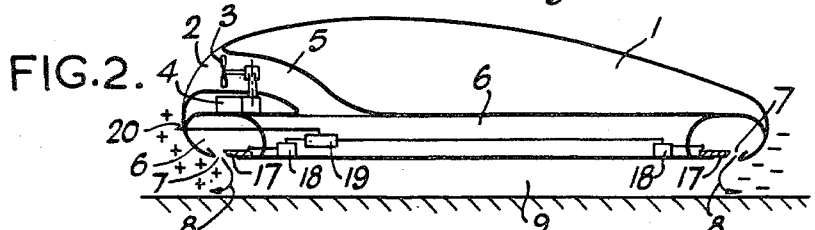
Figure 3:
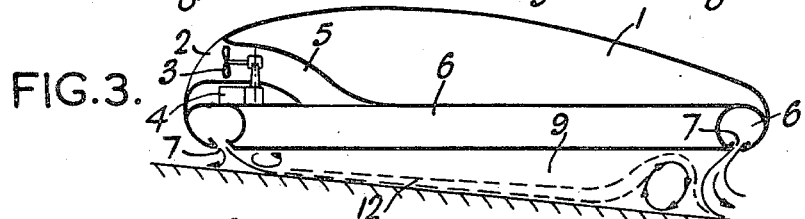
Figure 4:
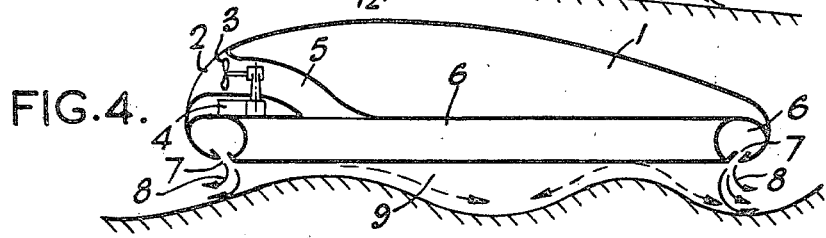
Figure 5:
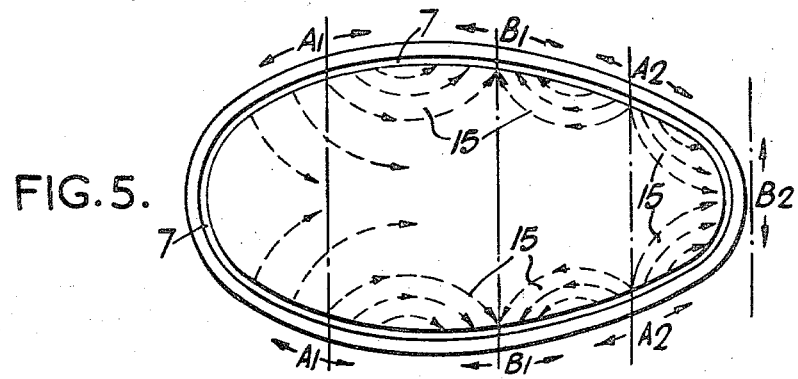
Figure 6:
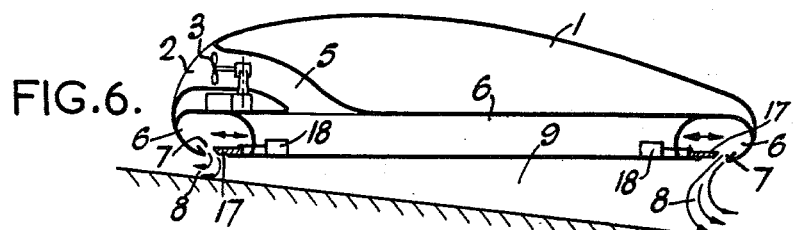
Figure 7:
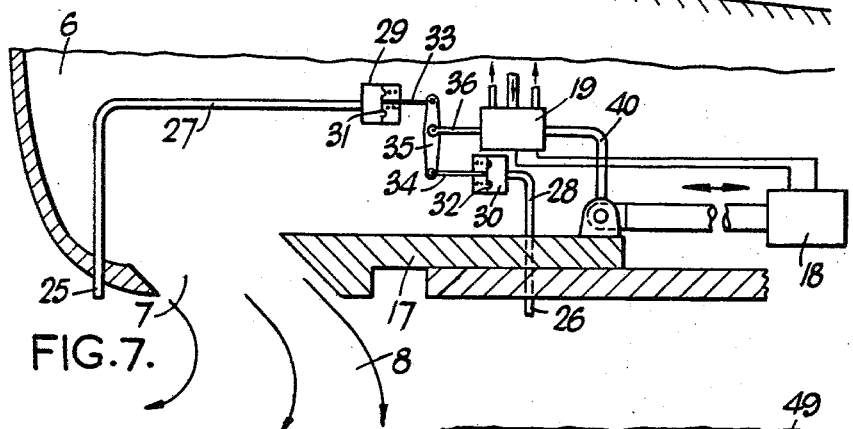
Figure 8:
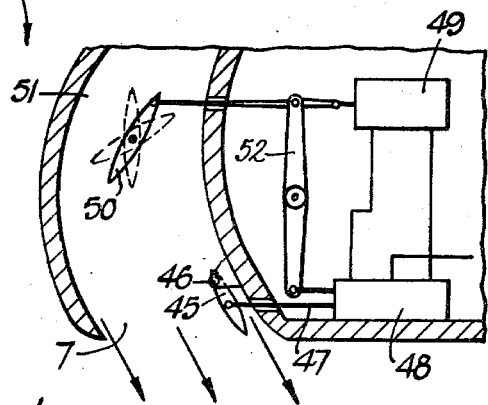
Figure 9:
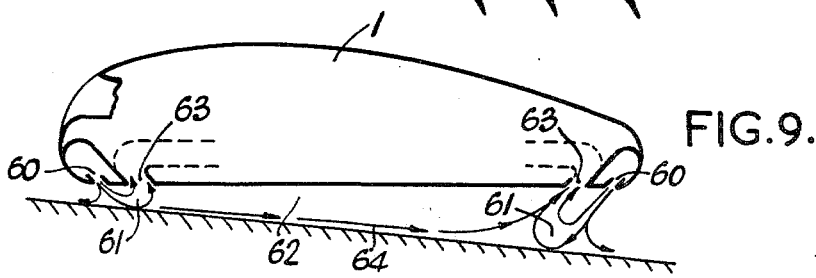

The invention will be more readily understood by the following description of certain embodiments of the invention in conjunction with the accompanying drawings in which:

FIGURE 1 is a vertical cross-section of a vehicle of the type to which the invention relates, shown in normal conditions, FIGURE 2 is a similar cross-section to FIGURE 1 illustrating one embodiment of the invention, FIGURE 3 is a similar cross-section to FIGURE 1 illustrating diagrammatically the "cross-flow" phenomena from front to back of the vehicle, on an inclined surface, FIGURE 4 is a similar cross-section to FIGURE 1 showing a vehicle operating over a multiplicity of obstacles such as waves, FIGURE 5 is an inverted plan view of the vehicle shown in FIGURE 4, illustrating diagrammatically the "cross-flow" phenomena, FIGURE 6 is a vertical cross-section similar to FIGURES 1 and 3 of a vehicle embodying the invention, FIGURE 7 is a vertical cross-section of part of the vehicle shown in FIGURE 6, to an enlarged scale, FIGURE 8 is a similar section to that of FIGURE 7, showing an alternative embodiment of the invention, FIGURE 9 is a vertical cross-section of an alternative form of vehicle showing the "cross-flow" phenomena, FIGURE 10 is a vertical cross-section of part of the vehicle shown in FIGURE 8, to an enlarged scale, illustrating the application of an embodiment of the invention, FIGURE 11 is a vertical cross-section of a further vehicle embodying an alternative form of the invention, FIGURE 12 is a vertical cross-section of the bottom of a vehicle having a so-called Coanda curtain system, and embodying the invention, FIGURE 13 is a vertical cross-section of the bottom of a vehicle having a "diffusion" curtain system, also embodying the invention, FIGURE 14 is a vertical cross-section similar to FIGURE 7 of a further form of vehicle embodying the invention, FIGURE 15 is a vertical cross-section similar to FIGURE 6 of still another embodiment of the invention.

FIGURE 1 illustrates a vehicle 1, having an air-inlet 2 at the front through which air is drawn by propellers 3 driven by engines 4. The air from the propellers flows through a chamber 5 into a duct 6 which is formed round the periphery of the bottom of the vehicle. Formed in the bottom surface of the vehicle and adjacent to the periphery thereof is a continuous annular supply port 7, the supply port communicating with the duct 6. Air flows from the duct through the supply port to form an air curtain 8 which forms and maintains a cushion of pressurised air 9 beneath the vehicle. The cushion of pressurised air 9 supports or assists in supporting the vehicle above the surface.

As described above, when the vehicle encounters conditions which upset the equilibrium of the air curtain, cross-flow is likely to occur. An example of operating conditions which upsets the air curtain equilibrium is forward speed. As the speed of the vehicle increases from zero, a pressure above ambient, due to the forward speed, is built up outside the air curtain at the front of the vehicle. This pressure rise reduces the differential pressure across the air curtain, which therefore is stronger than required, having excessive mass flow. Some of this excessive mass flow breaks away from the air curtain and a stream of air flows under the cushion of pressurised air to the rear of the vehicle. This cross-flow is usually further augmented by an increased differential pressure occurring across the air curtain at the rear of the vehicle. This increased pressure differential is due to a reduced pressure, below ambient, which occurs outside the rear curtain through the forward speed of the vehicle. The air curtain at the rear is thus weakened and air flows from the front air curtain to the rear air curtain. Whilst this air which flows from the front to the rear assists the rear curtain to a slight extent, most of its energy is dissipated to the cushion without any advantageous effect and represents a loss of energy and of power.

The cross-flow of air can be reduced or prevented, by transferring air from the front air curtain to the rear air curtain and this can most readily be done by varying the width of the supply ports through which issues the air forming the curtains. Thus the front supply port is reduced in width and the rear supply port is increased in width. There is also a tendency for the vehicle to assume a "nose-up" attitude during forward motion, and it is normally desirable to prevent or reduce this attitude. This can be done by reducing the mass flow of the air forming the front curtain and preferably increasing the mass flow of the rear curtain. The variation of mass flow of the curtain forming air can be done manually, but preferably it is controlled automatically by a speed sensing device. A vehicle having such an arrangement is illustrated diagrammatically in FIGURE 2. The vehicle shown is substantially as that shown in FIGURE 1, with the exception that the flow of curtain forming air through supply port 7 is controlled by sliding flaps 17 operated by servo motors 18 which in turn are controlled by a control valve 19 which operates in accordance with pressure variations detected by a sensing head 20. As the forward speed of the vehicle varies, the pressure at the front of the vehicle will also vary, being detected by the sensing head 20. The control valve 19 and servo motors 18 will be operated to maintain the mass flow of the air curtains at the correct relative value.

A further example of operating conditions which will upset the air curtain equilibrium is illustrated diagrammatically in FIGURE 3. The vehicle shown is the same as in FIGURE 1. The vehicle 1 is shown operating over an inclined surface which for example may be a steady slope or will occur for some time when over waves several times the length of the vehicle or sand dunes or other surfaces having similar profiles. As shown, the vertical height between the bottom of the vehicle and the surface varies, in the present example being less at the front than at the rear, being below normal at the front and above normal at the rear. Thus the curtain is too strong at the front for this reduced height and is too weak at the rear. As a result a stream of air 12 flows from the front of the vehicle to the rear as shown. This stream of air 12, loses energy in flowing under the cushion 9 and represents a waste of power. It will be appreciated that over an inclined surface as shown in FIGURE 3, the cross-flow will not be from a small localised area at the front to a similar small area at the rear but will extend round the periphery of the vehicle at the front and rear, the actual amount of cross-flow decreasing gradually from the maximum at front and rear to zero at the sides.

More complex forms of cross-flow will occur when the vehicle is operating over smaller obstacles such as short waves. This is shown diagrammatically in FIGURES 4 and 5 which again illustrate a vehicle as shown in FIGURE 1. The strength of the air curtains at areas A1 and A2 will be too great due to the decreased height while the curtains at areas B1 and B2 will be too weak. There will thus be cross-flow from the areas A1 and A2 to the areas B1 and B2, and even possibly also some cross-flow from front to rear, as shown diagrammatically by the arrows and dotted lines 15. Other forms of cross-flow will occur with other forms of obstacle or operating conditions. However, for convenience, in the embodiment of the invention now to be described, the cross-flow will be considered as occurring from the front to the rear of the vehicle.

FIGURES 6 and 7 illustrate diagrammatically the application of the invention to a vehicle as illustrated in FIGURE 1, that is, with a simple curtain system in which the air forming the curtain is deflected outwards by the cushion pressure and is lost into the atmosphere. FIGURE 6 is similar to FIGURES 1, 3 and 4 with the exception that, as in FIGURE 2, sliding flaps 17 are provided to vary the width of the supply port 7 and thus to vary the mass flow of the air forming the air curtain 8. The flaps 17 are operated by servo motors 18 actuated in accordance with the variation of parameters which occurs when cross-flow is present. This is more readily seen in FIGURE 7 which is a view of the bottom of the front of the vehicle in FIGURE 6, to a larger scale.

The flap 17 is moved by an hydraulic servo motor 18.

The servo motor is controlled by a control valve 19 which is in turn operated by the out-of-step variation, in the present example, of the pressures just outside and just inside the air curtain 8, that is, the differential pressure across the air curtain. This is measured by two pressure sensing heads 25 and 26, head 25 sensing the pressure outside the air curtain and head 26 sensing the pressure inside the curtain. The sensing heads 25 and 26 are connected via pipes 27 and 28 to capsules 29 and 30 respectively. Diaphragms 31 and 32 of the capsules are pivotally connected by rods 33 and 34 one to each end of a link 35. A further rod 36, the operating rod of the valve 19, is pivotally connected to the centre of the link 35. In operation, if, for example, the external pressure sensed by sensing head 25 increases, thus decreasing the differential pressure across the air curtain and making it too strong, the diaphragm 31 of capsule 29 would be moved to the right, rotating the link 35 about its connection with rod 34. This opens the valve 19 in a direction to cause the servo motor 18 to slide the flap 17 in a direction such as to decrease the width of the port 7. Movement of the flap 17 operates by means of linkage 40 a follow-up in the valve 19 to shut off the valve when the flap has reached its correct position. This type of follow-up or servo-motor valve is well known in the art, as illustrated by FIGURE 3 of British Patent No. 462,483. A reduction in pressure outside the air curtain, or an increase in pressure inside the curtain, will cause reverse action of the valve 19, servo motor 18 and flap 17. Simultaneous rise or fall of both pressures, which does not vary the differential pressure across the air curtain, will cause the link 35 merely to rotate about its connection to the rod 36 without operating the valve 19. Where it is required only to vary the mass flow at the front and rear of the vehicle, flaps 17 and servo motors and control valves 18 and 19 would only be provided at the front and rear. Where it is required to vary the mass flow at all positions round the vehicle, flaps 17 with their servo motors and control valves 18 and 19 would be provided all round the vehicle, and progressive variation in mass flow thus obtained.

FIGURE 8 shows an alternative method of varying the mass flow to the supply port 7, and also an alternative means for sensing a parameter variation for cross-flow indication. In this example variation of the efflux angle of the air issuing from the supply port 7 to form the air curtain, is sensed. As shown, the air flowing to the supply port breaks away from the inner edge some short distance inside the port. Variation in the pressure differential across the air curtain will cause the air curtain to be deflected more or less by the cushion, resulting in a variation in the angle of the flow path of the air inside the supply port on its inner side. This flow path angular variation is detected or sensed by a vane 45 hinged at 46 on an extension from the inner side of the supply port. A rod 47 is connected to the vane 45 and variation of the vane operates a valve 48 which in turn controls the operation of an actuator 49. The actuator 49 rotates a spoiler vane 50 situated in a supply duct 51 which supplies air to the supply port 7. For example, a decrease of pressure in the inside of the air curtain, or an increase on the outside, causes a decreased differential pressure across the air curtain. The air curtain is thus deflected less by the cushion 9, and the angle of flow of the air on the inside of the supply port 7 is decreased relative to the horizontal. The vane 45 will thus rotate slightly anticlockwise operating valve 48 via rod 47. The operation of valve 48 allows the actuator 49 to rotate the spoiler vane 50 clockwise. This reduces the flow of air through the duct 51 to the supply port 7, reducing the mass flow of the air forming the air curtain. Follow-up linkage 52 is provided to shut off the valve 48 when the spoiler vane 50 is in the correct position. The valve 48 may also be of the type illustrated in previously mentioned British Patent No. 462,483.

In the vehicles so far described the air curtain has been of a simple curtain form. In vehicles with recovery systems, having air curtains in which at least part of the curtain forming air is recovered into the vehicle, cross-flow will still occur, as shown in FIGURE 9. In this example, air issues from a supply port 60 forming an air curtain 61 which flows initially downwards and inwards, the air curtain then being deflected upwards by the cushion of pressurised air 62, the curtain forming air then flowing into a recovery port 63 formed in the bottom of the vehicle inboard of the supply port 60. When, as shown in FIGURE 9, the height at the front of the vehicle is decreased below the normal height, the height at the rear generally increasing above the normal as shown, then a stream of air 64 cross-flows from the front portion of the air curtain to the rear portion. As stated above, this cross-flow represents a loss of power. Localised cross-flows may also occur as shown in FIGURES 4 and 5. In such recovery systems it is usually more convenient to sense variations in the flow of the recovered air through the recovery port although control of mass flow is still applied at the supply port.

One typical example for sensing variations in recovered air flow is shown in FIGURE 10. This is very similar to that shown in FIGURE 8, the only difference being that a vane 66 is mounted in the recovery port 67 and senses variations in the angle of flow of air through the port. A valve 68, actuator 69 and spoiler vane 70 are provided and operate in a similar manner to those in FIGURE 8.

For a small vehicle or one where the only cross-flow which is considered to be sufficiently large to be important is that occurring diametrically, or the like, across the vehicle, then a simple mass flow variation device as shown in FIGURE 11 can be used. Air is drawn in through an intake 75 by a propeller 76 driven by an engine 77. The air from the propeller flows through a duct 78 to a supply port 79. Mounted beneath the propeller 76 is a disc-shaped vane or valve 80. This valve is mounted on a spherical heating 81 surrounding the shaft 82 connecting the engine 77 and propeller 76 but clear of the shaft. The valve 80 can tilt in any direction and controls the distribution of the air from the propeller into the duct 78. Thus when the vehicle is operating in the conditions shown, one side of the vehicle being below mean and the other side above, the valve 80 is tilted to reduce the mass flow of air to the side at low height and increase it to the other side. Sensing and control apparatus as shown in FIGURES 7 and 8 for simple air curtains and outward recovery systems and as in FIGURE 10 for inward recovery systems may be used to control the tilt of the valve 80. For example, as shown in FIGURE 11, a vane 81 is mounted in the supply port 79 and detects variations in the angle of ejection of the air forming the air curtain. The vane 81 operates the valve 82 which in turn controls the operation of an actuator 83, the latter varying the tilt of valve 80. The operation of vane 81, valve 82 and actuator 83 is similar to that of vane 45, valve 48 and actuator 49 of FIGURE 8. A minimum of two such sensing and control devices, positioned at 90° to each other, would be required to obtain the correct inclination of the valve, although a minimum of three such devices will be required if, for example, the loading of the vehicle is likely to vary and thus vary the datum cushion pressure.

For the examples so far described, the air curtain has been considered as one in which the air flows from a supply port, in a path separating from the structure and contacting the surface over which the vehicle is operating. The air may then escape into the surrounding atmosphere or flow back upwards regaining contact with the vehicle. In vehicles having other forms of flow path for the air which contains the cushion, the air curtain may at all times remain in contact with the bottom surface of the vehicle, such as in the above mentioned so-called "Coanda" systems and "Diffusion" systems. FIGURE 12 illustrates one form of Coanda curtain system, and FIGURE 13 illustrates a diffusion system.

In FIGURE 12, which shows the bottom portion of a vehicle only, air from a source not shown passes via a duct 85 to an annular supply port 86. The periphery of the bottom of the vehicle is in the form of a rounded rim 87 which is profiled so that the air issuing from the supply port 86 flows round and under the rim 87 and into an annular recovery port 88 surrounding the rim, the air adhering to the surface of the rim due to the suction of the recovery port and to the well-known Coanda effect. In disequilibrium conditions, cross-flow will occur as shown. The disequilibrium results in the variation of parameters in the same manner as for the above described examples and may be similarly detected. For example in FIGURE 12, the pressure outside the curtain, that is the pressure immediately outside the rim 87, and the pressure immediately inside the supply port 86 can be measured by pressure sensing heads 96. Alternatively a vane may be mounted in the supply port 86 to sense directional variations in the flow of the air forming the air curtain. The variations of parameters sensed can be used to control the operation of a valve and a servo motor, as in FIGURE 7, to vary the position of sliding vanes 89 which vary the flow of air through the ducts 85.

FIGURE 13 illustrates a diffusion system of air curtain. Air issues from an annular supply port 90 formed in the bottom of the vehicle adjacent to the periphery thereof. Spaced inboard of the supply port is an annular recovery port 91, the surface 92 of the bottom of the vehicle between the supply port and recovery port being inclined upwards. This forms, with the surface over which the vehicle is operating, a divergent passage and the air issuing from the supply port 90 flows inward towards the centre of the vehicle diffusing as it passes through the divergent passage. A cushion of pressurised air is formed beneath the vehicle and is contained round its periphery by the curtain of air flowing through the divergent passage. The velocity head of the air issuing from the supply port, due to the diffusion of the air curtain, becomes a pressure head by the time it reaches the recovery port. The curtain forming air then flows into the recovery port and then through a duct 93 where it is re-energised by, for example, a compressor 94, after which it passes again to the supply port 90. Cross-flow will occur, as in previous examples, as shown, and can be detected by sensing the variation of parameters, as described above. For example, the pressures immediately outside and inside the air curtain can be measured by means of pressure sensing heads 97, or a vane or vanes positioned in the recovery port 91 can be used to sense variations in the direction of flow into the recovery port. These variations can be used to control the operation of a valve and a servo motor, as in FIGURE 7, to vary the position of sliding vanes 95 which vary the width of the supply ports 90.

The invention is readily applicable to vehicles having air curtain systems which are a multiple or more complex form of the examples described and illustrated. It is also applicable to vehicles in which only part of the periphery of the cushion or cushions is contained by air curtains, for example where side walls depending from the bottom surface of the vehicle act to contain the cushion along the sides of the vehicle. In such an instance cross-flow will only take place between the ends of the vehicle and/or between localities at each end.

In a vehicle in which at least part of the air forming the air curtain is recovered through a recovery port formed outside the supply port, the sensing and control apparatus, together with the means for varying the mass flow of the curtain forming air, is generally the same as for a simple air curtain system. For example, as shown in FIGURE 14, air issues from a supply port 98 in an inwards and downwards direction, being deflected round and outwards by the cushion pressure, at least part of the air then flowing into the recovery port 99. The width of the supply port 98 is varied by a sliding flap 100, the operation of which is controlled by a valve 101 and a servo motor 102 in response to pressure differential variations measured by sensing heads 103. The operation of sensing heads 103, valve 101 and servo motor 102 is similar to the operation of the sensing heads 25 and 26, valve 19 and servo motor 18 of FIGURES 6 and 7.

A further form of vehicle to which the invention may be applied is one in which an air curtain is formed to divide the cushion of pressurised air, as illustrated in FIGURE 15. In this construction, an air curtain 105 is formed substantially normal to the fore and aft axis of the vehicle midway between the front and rear parts of the cushion containing curtain 106. In such a vehicle, when travelling forward or operating over an incline, cross-flow will occur initially between the air curtain 105 at the mid-position and the rear part of the air curtain 106. In such cases it is preferable that relative mass flows of the front and rear portions of the air curtains are varied as described above, although cross-flow from the front portion of the air curtain has not commenced. In the embodiment illustrated, the relative mass flows of the front and rear portions of the air curtains may be varied by the provision of pressure sensing heads 107, positioned on either side of the air curtain 105, to measure the pressure drop, if any, across the air curtain 105. The pressure sensing heads 107 control the position of a sliding flap 108 associated with curtain 105 in the same manner as the flaps 17 are controlled in FIGURES 6 and 7.

In all the examples described and illustrated the supply port or ports and/or the recovery port or ports may be in the form of annular slots or in the form of a series of short slots in an annular configuration.

It will be appreciated that although the examples described with reference to vehicles travelling over inclined surfaces have been for vehicles traversing a rising incline, the same conditions of cross-flow occur when traversing a down-going incline. In this case cross-flow is from rear to front and variation of relative mass flow in a reverse sense to that described above will be required.

The applications of Cockerell referred to herein are assigned to the assignee of the instant application.

I claim:

1. A vehicle for travelling over land and/or water which is supported above the surface over which it is operating by at least one cushion of pressurised fluid, the cushion being contained round at least part of its periphery by a fluid curtain formed by fluid flowing from a supply port between the bottom surface of the vehicle and the surface over which the vehicle is operating, comprising means for sensing and producing signals indicative of variations in at least one of the following parameters, variation of which is indicative of a need for variation in the strength of the fluid curtain, (a) the pressure differential across the fluid curtain, (b) the height of the supply port above the surface over which the vehicle is operating, and (c) the angle of flow of the curtain forming fluid relative to the bottom surface of the vehicle, and means responsive to said signals for adjusting the mass flow of the fluid forming the fluid curtain at any locality round the circumference of the fluid curtain to that required to sustain the cushion in the conditions prevailing at that locality, said last named means being operative to reduce the mass flow of the curtain forming fluid when said parameter sensing means produces a signal indicative of a decrease in at least one of said parameters.

2. A vehicle as claimed in claim 1 in which the parameter sensing means comprises at least one vane mounted in the path of the fluid forming the fluid curtain, in or adjacent to the supply port, the vane being capable of rotation so that it can at all times have its chordwise axis parallel to the flow path of the curtain forming fluid.

3. A vehicle for traveling over land and/or water which is supported above the surface over which it is operating by at least one cushion of pressurised fluid, the cushion being contained round at least part of its periphery by a fluid curtain formed by fluid flowing from a supply port between the bottom surface of the vehicle and the surface over which the vehicle is operating, comprising means for sensing and producing signals indicative of variations in at least one of the following parameters, variation of which is indicative of a need for variation in the strength of the fluid curtain, (a) the pressure differential across the fluid curtain, (b) the height of the supply port above the surface over which the vehicle is operating, and (c) the angle of flow of the curtain forming fluid relative to the bottom surface of the vehicle, and means controlled by said signals for varying the mass flow of the fluid forming the fluid curtain at any locality round the circumference of the fluid curtain to that required to sustain the cushion in the conditions prevailing at that locality, said last named means being operative to reduce the mass flow of the curtain forming fluid when said parameter sensing means produces a signal indicative of a decrease in at least one of said parameters, said parameter sensing means comprising at least one pressure sensing device for sensing variations in the pressure immediately outside the fluid curtain and at least one pressure sensing device for sensing variations of the cushion pressure immediately inside the fluid curtain.

4. A vehicle for travelling over land and/or water which is supported above the surface over which it is operating by at least one cushion of pressurised fluid, the cushion being contained round at least part of its periphery by a fluid curtain formed by fluid flowing from a supply port between the bottom surface of the vehicle and the surface over which the vehicle is operating, comprising means for sensing and producing signals indicative of variations in at least one of the following parameters at a particular locality round the circumference of the fluid curtain, variation of which parameter is indicative of a need for variation in the strength of the fluid curtain at that locality, (a) the pressure differential across the fluid curtain, (b) the height of the supply port above the surface over which the vehicle is operating, and (c) the angle of flow of the curtain forming fluid relative to the bottom surface of the vehicle, and means controlled by said signals for varying the mass flow of the fluid forming the fluid curtain at that locality, said last named means comprising means for varying the radial width of the supply port.

5. A vehicle for travelling over land and/or water which is supported above the surface over which it is operating by at least one cushion of pressurised fluid, the cushion being contained round at least part of its periphery by a fluid curtain formed by fluid flowing from a supply port between the bottom surface of the vehicle and the surface over which the vehicle is operating, comprising means for sensing and producing signals indicative of variations in at least one of the following parameters at a particular locality round the circumference of the fluid curtain, variation of which parameter is indicative of a need for variation in the strength of the fluid curtain at that locality, (a) the pressure differential across the fluid curtain, (b) the height of the supply port above the surface over which the vehicle is operating, and (c) the angle of flow of the curtain forming fluid relative to the bottom surface of the vehicle, and means controlled by said signals for varying the mass flow of the fluid forming the fluid curtain at that locality, said last named means comprising at least one valve for varying the mass flow to the supply port.

6. A vehicle for travelling over land and/or water which is supported above the surface over which it is operating by at least one cushion of pressurised fluid, the cushion being contained round at least part of its periphery by a fluid curtain formed by fluid flowing, from a supply port, between the bottom surface of the vehicle and the surface over which the vehicle is operating, comprising means for sensing a decrease in the pressure differential across the fluid curtain at at least one locality round the circumference of the curtain, and means controlled by said sensing means for reducing the mass flow of the fluid forming the fluid curtain at that locality.

7. A vehicle for travelling over land and/or water which is supported above the surface over which it is operating by at least one cushion of pressurised fluid, the cushion being contained round at least part of its periphery by a fluid curtain formed by fluid flowing from a supply port between the bottom surface of the vehicle and the surface over which the vehicle is operating, comprising means for sensing and producing signals indicative of a decrease in at least one of the following parameters at a particular locality round the circumference of the fluid curtain, (a) the pressure differential across the fluid curtain, (b) the height of the supply port above the surface over which the vehicle is operating, and (c) the angle of flow of the curtain forming fluid relative to the bottom surface of the vehicle, and means responsive to said signals for decreasing the mass flow of the fluid forming the fluid curtain at that locality.

8. A vehicle for travelling over land and/or water which is at least partly supported above the surface over which it is operating by a cushion of pressurised fluid formed and maintained by at least one curtain of fluid issuing from at least one supply port formed in the bottom of the vehicle and adjacent to the periphery thereof, the fluid curtain flowing initially in an inwards and downwards direction towards the said surface and being deflected by the cushion, comprising means for sensing and producing signals indicative of variations in the height of the supply port above the surface over which the vehicle is operating at at least one locality round the circumference of the curtain, and means responsive to said signals for varying the mass flow of the fluid forming the curtain at that locality, whereby the mass flow is adjusted to that required to form and maintain the cushion in the conditions prevailing at that locality in accordance with said signals, said last named means being operative to reduce the mass flow of the curtain forming fluid when said sensing means produces a signal indicative of a decrease in said height.

9. A vehicle for travelling over land and/or water which is supported above the surface over which it is operating by at least one cushion of pressurised fluid, the cushion being contained round at least part of its periphery by a fluid curtain formed by fluid flowing, from a supply port, between the bottom surface of the vehicle and the surface over which the vehicle is operating, comprising at least one pressure sensing device for sensing variations in the pressure immediately outside the fluid curtain, at least one pressure sensing device for sensing variations of the cushion pressure immediately inside the fluid curtain, means for varying the mass flow of the curtain forming fluid through the supply port, and servo-operated means controlled by said pressure sensing devices for actuating the mass flow varying means.

10. A vehicle for travelling over land and/or water which is supported above the surface over which it is operating by at least one cushion of pressurised fluid, the cushion being contained round at least part of its periphery by a fluid curtain formed by fluid flowing, from a supply port, between the bottom surface of the vehicle and the surface over which the vehicle is operating, comprising a plurality of independently operable means for varying the mass flow of the fluid forming the fluid curtain at at least two localities round the circumference of the fluid curtain, means for sensing variations in the pressure differential across the fluid curtain at each of said localities, and means responsive to such variations for independently actuating the mass flow varying means, said mass flow varying means being operative to reduce the mass flow of the curtain forming fluid when said sensing means senses a decrease in the pressure differential across the fluid curtain.

11. A vehicle for travelling over land and/or water which is supported above the surface over which it is operating by at least one cushion of pressurised fluid, the cushion being contained round at least part of its periphery by a fluid curtain formed by fluid flowing, from a supply port, between the bottom surface of the vehicle and the surface over which the vehicle is operating, comprising at least one vane so mounted in the path of the fluid forming the fluid curtain as to indicate by variations in the position of its chordwise axis variations in the angle of flow of the curtain forming fluid relative to the bottom surface of the vehicle, and means responsive to the movements of said vane for varying the mass flow of the curtain forming fluid.

12. A vehicle is claimed in claim 11 in which the vane is rotatably mounted in the path of the fluid flowing from the supply port.

13. A vehicle as claimed in claim 12 wherein the mass flow varying means includes at least one valve member for varying the mass flow of fluid to the supply port.

14. A vehicle as claimed in claim 12 wherein the mass flow varying means includes at least one member for varying the width of the supply port.

15. A vehicle as claimed in claim 12 wherein the mass flow varying means includes at least one sliding vane for varying the radial width of the supply port, and a servo-motor for operating said sliding vane.

16. A vehicle for travelling over land and/or water which is supported above the surface over which it is operating by at least one cushion of pressurised fluid, the cushion being contained round at least part of its periphery by a fluid curtain formed by fluid flowing, from a supply port, between the bottom surface of the vehicle and the surface over which the vehicle is operating, at least part of the curtain forming fluid also being recovered through a recovery port formed in the bottom of the vehicle, comprising at least one vane so mounted in the recovery port as to indicate by variations in the position of its chordwise axis variations in the angle of flow of the curtain forming fluid relative to the bottom surface of the vehicle as it enters the recovery port, and means responsive to the movements of said vane for varying the mass flow of the curtain forming fluid, said means including at least one valve member for controlling the mass flow of fluid to the supply port.

17. A vehicle for travelling over land and/or water which is supported above the surface over which it is operating by at least one cushion of pressurised fluid, the cushion being contained round at least part of its periphery by a fluid curtain formed by fluid flowing, from a supply port, between the bottom surface of the vehicle and the surface over which the vehicle is operating, at least part of the curtain forming fluid also being recovered through a recovery port formed in the bottom of the vehicle, comprising at least one vane so mounted in the recovery port as to indicate by variations in the position of its chordwise axis variations in the angle of flow of the curtain forming fluid relative to the bottom surface of the vehicle as it enters the recovery port, and means responsive to the movements of said vane for varying the mass flow of the curtain forming fluid, said means including at least one member for varying the width of the supply port.

18. A vehicle for travelling over land and/or water which is supported above the surface over which it is operating by at least one cushion of pressurised fluid, the cushion being contained round at least part of its periphery by a fluid curtain formed by fluid flowing, from a supply port, between the bottom surface of the vehicle and the surface over which the vehicle is operating, at least part of the curtain forming fluid also being recovered through a recovery port formed in the bottom of the vehicle, comprising at least one vane so mounted in the recovery port as to indicate by variations in the position of its chordwise axis variations in the angle of flow of the curtain forming fluid relative to the bottom surface of the vehicle as it enters the recovery port, and means responsive to the movements of said vane for varying the mass flow of the curtain forming fluid, said means including at least one sliding vane for varying the radial width of the supply port, and a servomotor for operating said sliding vane.

References Cited by the Examiner

UNITED STATES PATENTS

| | | | |
|---|---|---|---|
| 2,842,084 | 7/58 | Williams | 180—1 |
| 3,040,688 | 6/62 | Gram | 180—7 |

FOREIGN PATENTS 219,133   11/58   Australia.

A. HARRY LEVY, *Primary Examiner.*

PHILIP ARNOLD, *Examiner.*